US009184921B2

(12) United States Patent
Novak

(10) Patent No.: US 9,184,921 B2
(45) Date of Patent: Nov. 10, 2015

(54) INPUT CHALLENGE BASED AUTHENTICATION

(71) Applicant: Microsoft Corporation, Redmond, WA (US)

(72) Inventor: Mark F. Novak, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 13/714,405

(22) Filed: Dec. 14, 2012

(65) Prior Publication Data

US 2014/0173286 A1 Jun. 19, 2014

(51) Int. Cl.
G06F 21/31 (2013.01)
H04L 9/32 (2006.01)

(52) U.S. Cl.
CPC ............ H04L 9/3271 (2013.01); G06F 21/316 (2013.01); G06F 2221/2133 (2013.01)

(58) Field of Classification Search
CPC .......... G06F 21/316; G06F 2221/2133; H04L 9/3271
USPC ...................... 726/19, 17, 21, 28, 29; 713/176
See application file for complete search history.

(56) References Cited

U.S. PATENT DOCUMENTS

| 8,255,323 | B1 | 8/2012 | Casey et al. | |
| 8,539,550 | B1* | 9/2013 | Terres et al. | 726/2 |
| 2002/0029341 | A1* | 3/2002 | Juels et al. | 713/184 |
| 2003/0126471 | A1 | 7/2003 | Hillis et al. | |
| 2008/0034218 | A1 | 2/2008 | Bender | |
| 2009/0083847 | A1* | 3/2009 | Fadell et al. | 726/16 |
| 2010/0052851 | A1* | 3/2010 | Kaehler | 340/5.81 |
| 2010/0201478 | A1* | 8/2010 | Veen et al. | 340/3.1 |
| 2011/0156867 | A1* | 6/2011 | Carrizo et al. | 340/5.85 |
| 2011/0173453 | A1* | 7/2011 | Parsell et al. | 713/180 |

(Continued)

FOREIGN PATENT DOCUMENTS

EP 2357596 A1 8/2011

OTHER PUBLICATIONS

"International Search Report & Written Opinion for PCT Application No. PCT/US2013/075183", Mailed Date: Mar. 27, 2014, Filed Date: Dec. 13, 2013, 10 Pages.

Primary Examiner — Chau Le
Assistant Examiner — Don Zhao
(74) Attorney, Agent, or Firm — Timothy Churna; Kate Drakos; Micky Minhas

(57) ABSTRACT

Input challenge based authentication techniques are described in which data regarding a user's input signature is employed for authentication of the user to access resources. Different users have distinct input signatures that are indicative of the manner in which each individual user provides input including at least typing characteristics and timing data. Data regarding input signatures may be captured from user interaction with computing devices and associated with user accounts. Once sufficient data regarding a user's input signature is captured, access to a user account may be controlled at least in part based on the input signature. To do so, an input challenge that indicates a non-secret pattern of input is presented to the user in connection with an authentication sequence. The user reproduces the non-secret pattern of input and selective access to the user account is granted depending upon whether or not the reproduction matches the input signature.

20 Claims, 5 Drawing Sheets

(56) References Cited

U.S. PATENT DOCUMENTS

| | | | |
|---|---|---|---|
| 2011/0298709 A1* | 12/2011 | Vaganov | 345/158 |
| 2012/0130714 A1* | 5/2012 | Zeljkovic et al. | 704/235 |
| 2012/0174213 A1* | 7/2012 | Geiger et al. | 726/19 |
| 2012/0246737 A1* | 9/2012 | Paxton et al. | 726/27 |
| 2012/0323700 A1* | 12/2012 | Aleksandrovich et al. | 705/14.69 |
| 2013/0151515 A1* | 6/2013 | Davis et al. | 707/736 |
| 2013/0276095 A1* | 10/2013 | Hoareau et al. | 726/16 |
| 2013/0276099 A1* | 10/2013 | Hoareau et al. | 726/18 |

* cited by examiner

INPUT CHALLENGE BASED AUTHENTICATION

BACKGROUND

Computing device users may use local and online accounts to access various computing resources. Users may seek access to their accounts from different devices and may also share devices to access respective accounts. Authentication of users to prove the users "are who they say they are", differentiate between users, and provide selective access to computing resources is a persistent challenge faced by service providers. Traditionally, authentication techniques rely upon shared secrets such as passwords or digital keys. However, shared secrets can be stolen or compromised. Further, management of shared-secrets can be complex and frustrating, and it is not uncommon for users to forget their passwords. Thus, although shared secret based authentication techniques may be effective, there are some drawbacks associated with the techniques.

SUMMARY

Input challenge based authentication techniques are described. In one or more implementations, data regarding a user's input signature is captured and associated with a corresponding user account. The input signature is indicative of the manner in which the user provides input including characteristics of keystrokes, typing patterns, mouse clicks, gestures, input timing data, and so forth. Different users have distinct input signatures that may be employed to differentiate between the users. Once sufficient data regarding a user's input signature is captured, access to a user account may be controlled at least in part based on the input signature. To do so, an input challenge that indicates a non-secret pattern of input (e.g., an exposed passphrase) may be output for display to the user in connection with an authentication sequence. The user reproduces the non-secret pattern of input, and the reproduction is compared to the input signature. Selective access to the user account may then be granted depending upon a determination regarding whether the reproduction matches the input signature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Traditionally, authentication techniques rely upon shared secrets such as passwords or digital keys. However, shared secrets can be stolen and/or users sometimes have difficulty managing and remembering their passwords. As such, shared secret based authentication techniques may be less than ideal for some authentication scenarios.

Input challenge based authentication techniques are described in which data regarding a user's input signature is employed for authentication of the user to access resources. Different users have distinct input signatures that are indicative of the manner in which each individual user provides input including characteristics of keystrokes, typing patterns, clicks, gestures, input timing data, and so forth. In one or more implementations, data regarding input signatures may be captured in the course of normal user interactions with computing devices and may be associated with respective user accounts. Once sufficient data regarding a user's input signature is captured, access to a user account may be controlled at least in part based on the input signature. To do so, an input challenge that indicates a non-secret pattern of input may be output for display to the user in connection with an authentication sequence. In contrast to traditional techniques, a textual passphrase or other suitable pattern of input for the input challenge is generated by a provider and may be shown/demonstrated to the user "in the clear." The user reproduces the non-secret pattern of input, and the reproduction is compared to the input signature. Selective access to the user account may then be granted depending upon whether or not the reproduction is determined to match the input signature.

In the discussion that follows, a section titled "Operating Environment" is provided and describes one environment in which one or more embodiments can be employed. Following this, a section titled "Input Challenge Based Authentication Examples" describes example techniques and details in accordance with one or more embodiments. Last, a section titled "Example System" describes example computing systems and devices that can be utilized in one or more implementations.

Operating Environment

Figure 1:
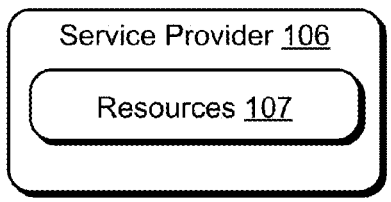
FIG. 1 illustrates an example operating environment in which input challenge based authentication techniques may be employed.
Figure 1:
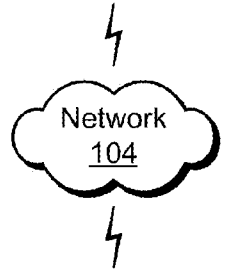
Figure 1:
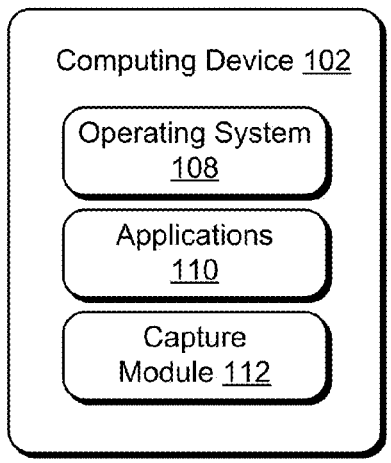
Figure 1:
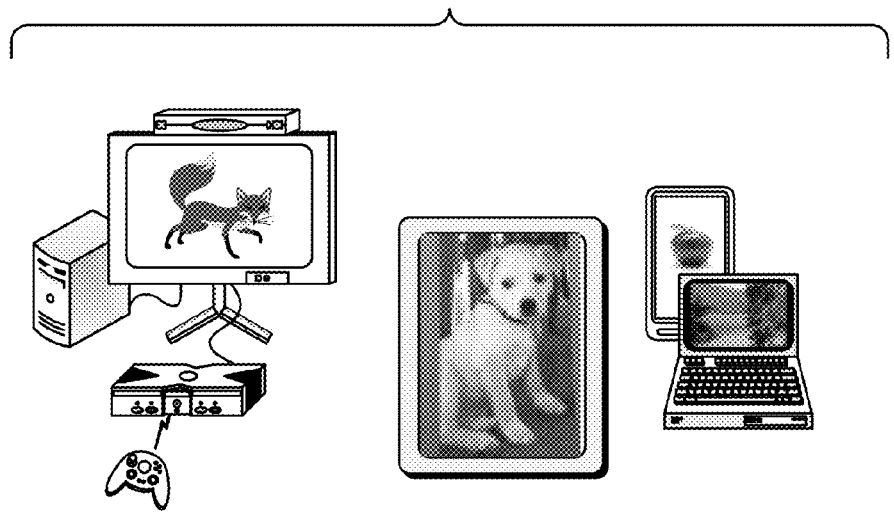

FIG. 1 illustrates an operating environment in accordance with one or more embodiments, generally at 100. The environment 100 includes a computing device 102 that is communicatively coupled over a network 104 to a service provider 106. The computing device may be configured in various ways to access and interact with various resources 107 (e.g., content and services) that are made available by the service provider over the network 104. Resources 107 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

The computing device is also depicted as including an operating system 108 and one or more applications 110 that may reside on computer-readable media and which are executable by a processing system of the computing device. The processing system may be configured in various way to retrieve and execute computer-program instructions from applications 110 to provide a wide range of functionality to the computing device 102, including but not limited to access to local resources available from the operating system 108, gaming, office productivity, email, media management, printing, networking, web-browsing to access resources 107, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, and the like. For example, the computing device 102 can be implemented as a television client device, a computer, and/or a gaming system that is connected to a display device to display media content. Alternatively, the computing device may be any type of portable computer, mobile phone, portable device, tablet or slate device, and/or may include an integrated display. Any of the computing devices can be implemented with various components, such as one or more processors and memory devices, as well as with any combination of differing components. One example of a computing system that can represent various systems and/or devices including the computing device 102 is shown and described below in FIG. 5.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 5.

In accordance with input capture techniques described herein, the computing device may also include or make use of a capture module 112. The capture module 112 represents functionality to monitor and capture data regarding input signatures in relation to user interaction with the computing device as described above and below. The capture module 112 may be configured to associate the captured data with respective user accounts including local accounts with an operating system 108 and/or web-based accounts with a service provider 106. In an implementation, the capture module 112 may be further configured to analyze the captured data to recognize the input signatures for different users. In addition or alternatively, the capture module 112 may supply the captured data to a web service for analysis and/or management. Access to user accounts may be controlled based wholly or partially upon input signatures that are associated with the user accounts in the manner described herein. The capture module 112 may be implemented as a standalone component as depicted in FIG. 1. The capture module 112 may also be implemented as an integrated component of the operating system 108. Additional details are described in relation to FIG. 2.

Figure 2:
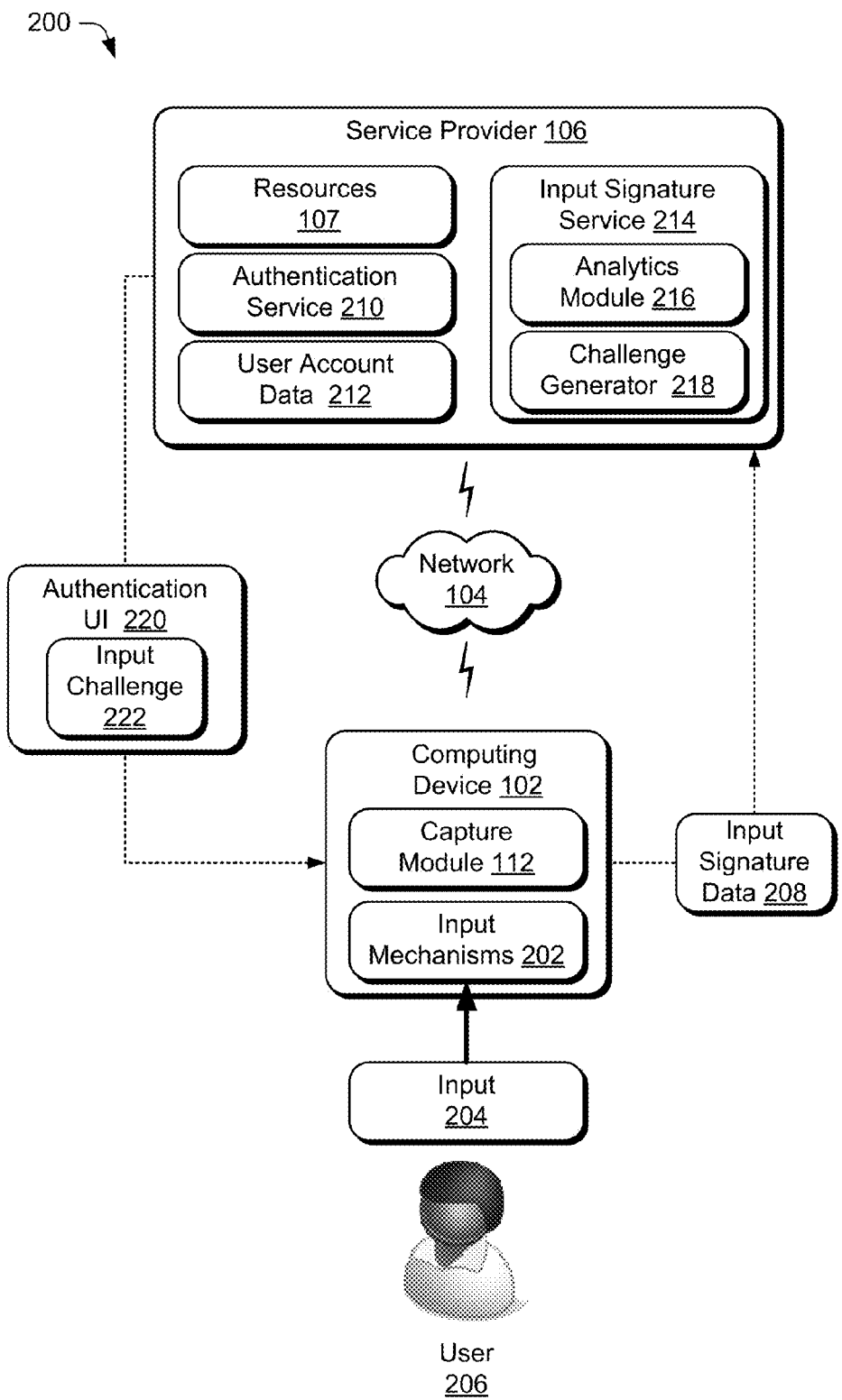
FIG. 2 is a diagram showing example details of a system suitable for input challenge based authentication techniques in accordance with one or more implementations.

In particular, FIG. 2 depicts generally at 200 a representative system that is configured to implement input challenge based authentication techniques described herein. In the example of FIG. 2, the computing device 102 includes the capture module 112 to capture and/or process data indicative of input signatures as discussed in relation to FIG. 1. The computing device 102 may also include one or more input mechanisms 202 that may be employed to provide input 204 by a user 206. For example, input mechanisms 202 may include interfaces and/or devices configured to provide input 204 for interaction with the computing device 102, such as keyboard/typing input, touchscreen or touch input, pointer device input, gestures, and so forth. The capture module 112 is configured to monitor input obtained from the user 206 via the input mechanisms 202 and generate corresponding input signature data 208 that is indicative of how the user 206 interacts with the input mechanisms 202. In particular, the capture module 112 detects characteristics of a user's input, which may include but are not limited to timing of keystrokes and/or mouse clicks, shapes of mouse arcs, keystrokes patterns, timing between input combinations, key to key timing, touch input locations, and gesture shapes, to name a few examples. Different characteristics may also be associated with different devices that a user uses to access their account.

The capture module 112 may be implemented to operate in the background during normal user interaction with the computing device. Thus, input signature data 208 indicative of a user's input signature is captured as the user goes about their business, such as while the user is browsing the web, preparing documents, typing emails, using application 110 or otherwise interacting "normally" with the computing device 102. Here, input signatures are discovered and associated with a user/user account without an explicit learning period in which the user is explicitly asked to input training text or other input patterns prepared to learn the user's input signature. In some scenarios, the user may be unaware of the operation of the capture module. Instead, the capture module 112 relies upon the user's own activities with computing devices to discover the input signature and collects data in the background.

As mentioned, the techniques described herein may be used to control access to either or both of local accounts and web-based accounts. FIG. 2 depicts an illustrative web-based example in which input challenge based authentication is used to control access to resources 107 available from a service provider 106 over the network 104. As such, various example components to implement input challenge based authentication are illustrated as being provided by the service provider 106. In a local implementation, however, one or more of the components shown and described in FIG. 2 in relation to the service provider 106 may additionally or alternatively be provided by the computing device 102 (e.g., as components of the operating system 108 or otherwise).

In the example of FIG. 2, though, resources 107 are represented as web-based resources provided by the service provider 106. The service provider 106 further includes an authentication service 210 and user account data 212 for accounts with the service provider. The authentication service 210 represents functionality operable to resolve a user's identity to control access to the resources 107. In particular, the authentication service 210 may implement an authentication sequence to determine that a user seeking access to resources is who they claim to be and/or are authorized to access the resources. The computing device for instance may be employed by a user to attempt a log-in to a user account by asserting credentials as part of the authentication sequence. The authentication service may verify the asserted credentials against credentials (e.g., user ID, password, key, shared secret, etc.) that are maintained in association with accounts as part of the user account data 212. Upon successful verification of the credentials, the computing device may be logged-in to the user account and therefore may be given access to resource 107 authorized for the account. If the authentication service 210 is unable to verify the credentials, access to the resources 107 is denied, a prompt to retry authentication may be output, and so forth.

The authentication service 210 may be further configured to make use of an input signature service 214 for selected authentication scenarios. In the depicted example, the input signature service 214 is represented as a standalone service. In addition or alternatively, the input signature service 214 may be implemented as a component of the authentication service 210. The input signature service 214 represents functionality for input challenge based authentication techniques described above and below. In particular, the input signature service 214 may perform various operations to discover and verify input signatures that may be used a factor for authentication. In one or more implementations, the input signatures for user accounts discovered and verified via the input signature service 214 may be employed as credentials by the authentication service 210 to control access to resources. The input signatures may be used alone or in combination with other, shared-secret based credentials to perform authentications.

The input signature service 214 may further include an analytics module 216 and a challenge generator 218. The analytics module 216 represents functionality for analysis of input signature data 208 to discover the input signatures, store data descriptive of the input signatures in association with user accounts, and determine whether or not input provided in response to an authentication challenge matches the input signature corresponding to an account to which access is sought.

The challenge generator 218 represents functionality operable to generate input challenges that may be employed for an authentication sequence. For example, the authentication service may output an authentication user interface 220 that may be configured in various ways to incorporate and present an input challenge 222 in response to an attempt to access resources 107. In accordance with techniques herein, the input challenge 222 is a non-secret pattern of input that is selected by the provider rather than the account holder. Thus, unlike passwords and other shared secrets, the input challenge 222 may be presented and/or demonstrated in the clear via the authentication user interface 220. Moreover, users do not have to have previous knowledge of the input challenge 222 or remember the challenge. In an implementation, the input challenge 222 may be a textual passphrase such as a word, phrase, sentence, paragraph or other alphanumeric pattern that a user may type in via a keyboard. Gestures, mouse clicks, arcs and traces, touch swipes, and other kinds of input may also be incorporated into an input challenge 222.

Accordingly, authentication using input challenge based techniques is dependent upon matching the manner in which the input challenge 222 is reproduced to an input signature associated with a user/account rather than exact matching of the passphrase or pattern of input itself. As mentioned, characteristics of the input such as timing of keystrokes and/or timing between key combinations are used to identify/verify the input signature. In some cases, a user may not even have to correctly reproduce the pattern of input to gain access to an account and/or resources, as long as the input characteristics of the reproduction match the input signature.

Thus, the selected passphrase (or other challenge) may be considered arbitrary in the sense that matching of the pattern reflected by the passphrase may not be a factor used for the authentication. Consequently, the input challenge may or may not be user-specific. The same input challenge may be used with different users/accounts since it is the input signature and not the pattern itself that is the basis of access control. In addition or alternatively, the input challenge presented in connection with an attempt to access a particular account may or may not be the same each time access to the account is attempted.

In some scenarios, though, the challenge generator 218 may produce user-specific input challenges 222 that are tailored to input signatures. For instance, key distinguishing characteristics that are likely differentiators of the user/account from others may be identified based on analysis of input signature data 208. An input challenge 222 may then be generated that specifically targets one or more such distinguishing characteristics identified for an input signature of a user account. Using such user-specific input challenges 222 may increase accuracy and/or speed-up input challenged based authentication.

Additionally, the input challenges 222 as well as particular characteristics of an input signature employed for authentication may be device specific. This is because different devices may provide different input mechanisms 202 and capabilities. Depending on the type of device that is being used at a particular time to access resources, different input mechanisms 202 may be available and/or the characteristics of a user's input may change for different device. For instance, timing of a user's keystrokes may by different when using different devices. Accordingly, input signatures that are determined by the input signature module 214 may be configured to contain device specific characteristics on a per device basis. For example, different characteristics and/or multiple different input signatures for the same user account may be captured and stored in relation to a tablet device, a laptop, a mobile phone, and so forth.

Likewise, the input challenge 222 that is generated for authentication also may change to match the input mechanisms 202 and capabilities of the device be used at a given time. In other words, the challenge generator 218 may be configured to provide device specific input challenges to different device. Here, the type of device being used may be detected as part of the authentication sequence in any suitable manner. For example, a device identifier may be provided by a computing device 102 when communications are established between the computing device 102 and service provider 106. Then, an appropriate device specific input challenge may be generated and corresponding device specific characteristics/signature data may be employed for analysis of input supplied in response to the device specific input challenge.

Having described an example operating environment, consider now example details regarding input challenge based authentication in accordance with one or more embodiments.

Input Challenge Based Authentication Examples

In the following section, implementation details and example techniques for input challenge based authentication are discussed. The discussion includes some an example procedure(s) that can be implemented in connection with any suitable hardware, software, firmware, or combination thereof. In at least some embodiments, the procedures may be implemented by way of a suitability configured computing device, such as the example service provider 106 of FIG. 2 that includes or otherwise makes use of an authentication service 210 and an input signature service 214. Aspects of the procedure may be implemented by way of a capture module 112 of a computing device and/or by functionality that is distributed between a service provider and a computing device.

Figure 3:
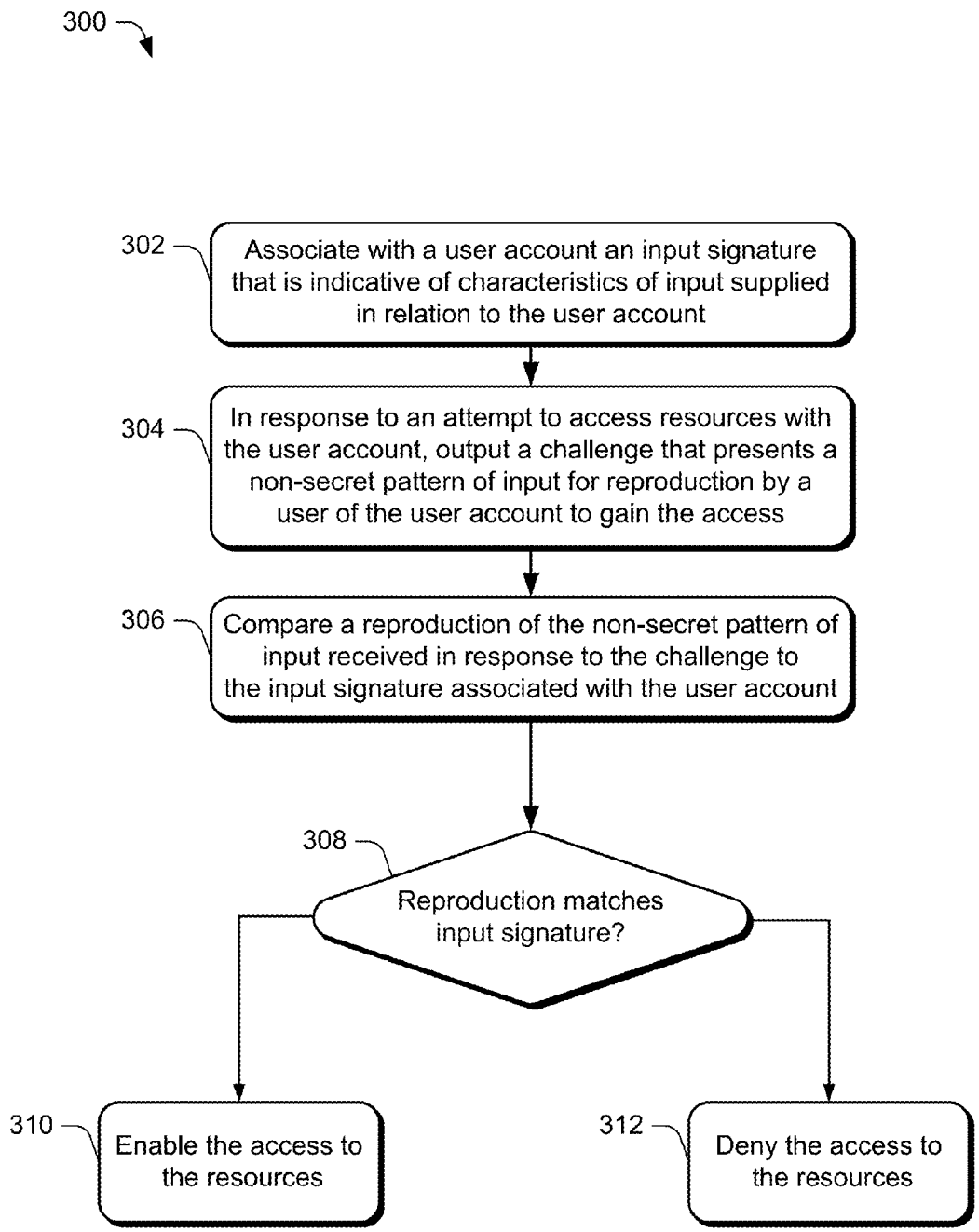
FIG. 3 is a flow diagram that describes details of an example procedure in accordance with one or more implementations.

FIG. 3 depicts an example procedure 300 in which input signatures are employed to control access to resources. An input signature that is indicative of characteristics of input supplied in relation to a user account is associated with the user account (block 302). In particular, data indicative of characteristics of input may be captured as users interact with computing devices by a capture module 112 as previously described. The input signature data 208 may be supplied to an input signature service 214 for analysis via an analytics module 216. The input signature service 214 may be implemented as a web-based service that facilitates access to online web-based resources or as a local service provided to control access to local accounts and resources. The analytics module 216 is configured to discover and/or derive input signatures based on the input signature data 208. The input signatures may then be stored in conjunction with user account data 212 to associate input signatures with corresponding user accounts. The input signature that is associated with a particular user account is indicative of characteristics of input supplied using the account. As mentioned, the characteristics may include but are not limited to timing of keystrokes, timing between key combinations, mouse click timing, keystrokes patterns, touch input locations, mouse input shapes, and gesture shapes, to name a few examples. These and other characteristics may be employed to match subsequent input with the input signature for an account.

In response to an attempt to access resources with the user account, a challenge is output that presents a non-secret pattern of input for reproduction by a user of the user account to gain the access (block 304). A reproduction of the non-secret pattern of input received in response to the challenge is compared to the input signature associated with the user account (block 306). This may occur in any suitable way. In one approach, the non-secret pattern of input is a textual passphrase shown in an authentication user interface. This may occur by way of an authentication service 210 that includes or make use of an input signature service 214. The authentication user interface may also include a prompt for a user to input a user ID and reproduce the textual passphrase to access their account. Other input patterns such as a combination of mouse clicks, arcs and so forth may be demonstrated visually to a user via the user interface to show the user the pattern they are to repeat. Thus, the non-secret pattern of input may incorporate a combination of textual and/or non-textual elements. In this way, different input mechanisms (e.g., typing and mouse input) may be used to form input patterns that may include textual passphrases as well as one or more non-textual elements.

When a reproduction of the non-secret pattern of input is received, the authentication service 210 may invoke the input signature service 214 to compare the reproduction to an input signature associated with the user account to which access is sought. Then, a determination is made regarding whether the reproduction matches the input signature (block 308). When the reproduction is determined to match the input signature, access to the resources is enabled (block 310). On the other hand, when the reproduction is determined not to match the input signature, access to the resources is denied (block 312).

For instance, the comparison of block 306 may involve detecting characteristics of the reproduction and comparing them to characteristics of the input signature. Thus, the determination of block 308 may be based at least in part upon how many matching characteristics are found and/or how closely the characteristics match. In one approach, a threshold number or percentage of characteristics that constitute a match may be defined and applied to make the determination. In another approach, a matching score may be derived based upon common characteristics between a reproduction and an input signature. The score may be derived using a weighted combination of the characteristics. Here, different weight factors may be assigned to different characteristics to control the contributions that individual characteristics have to the score. In yet another approach, the determination may be a binary determination of whether or not the reproduction contains designated distinguishable characteristics reflected by the input signature. In this binary approach, a match is found when the reproduction contains each of the distinguishable characteristics. If one or more of the designated distinguishable characteristics are absent from the reproduction, then the reproduction may be determined not to match the input signature. Various other techniques to determine matches between reproductions and input signatures are also contemplated.

Figure 4:
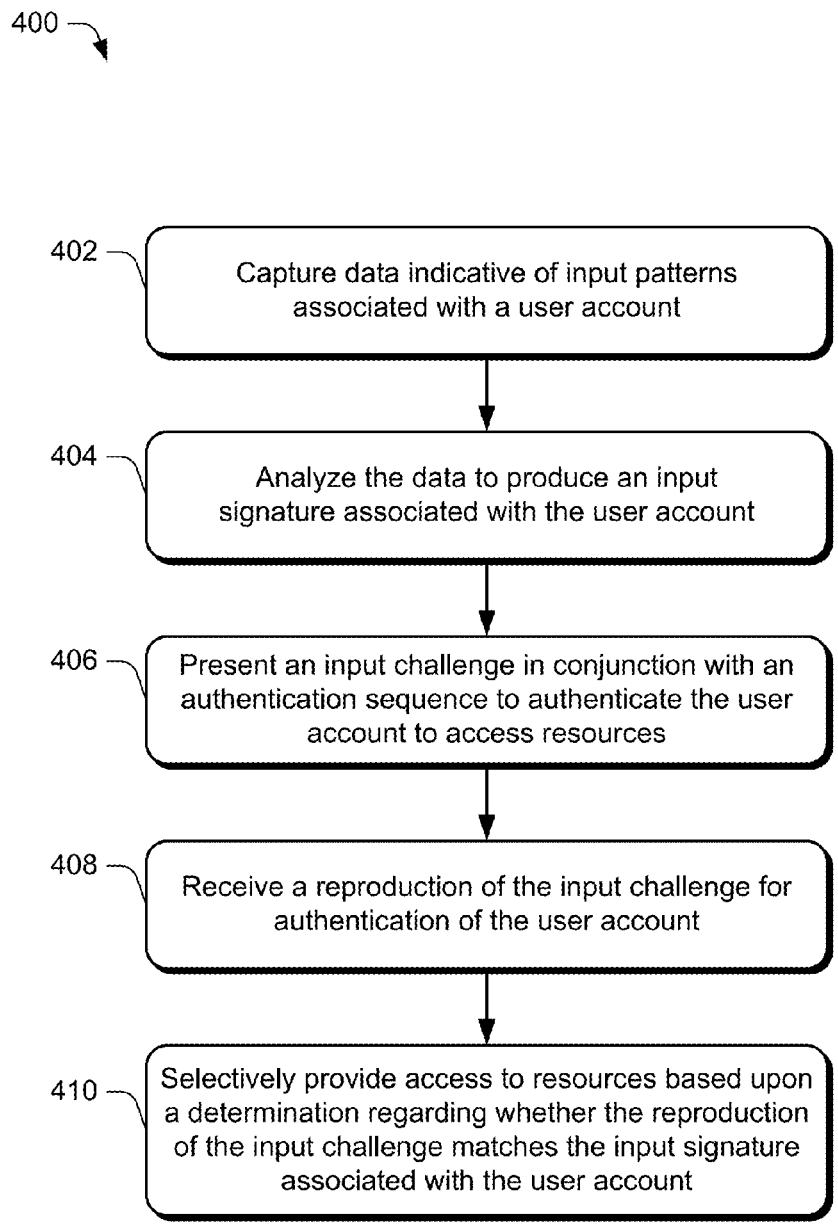
FIG. 4 is a flow diagram that describes details of another example procedure in accordance with one or more implementations.

FIG. 4 depicts another example procedure 400 in which input based challenges are used for authentication of users to access resources. In one or more implementations, the procedure may be performed by components of a computing device 102 to control access to local accounts and resources of the device. For instance, an operating system 108 may be configured to include or make use of a capture module 112, authentication service 210, and/or input signature service 214 as described above to implement input challenge based authentication of user to local operating system accounts.

Data is captured that is indicative of input patterns associated with a user account (block 402). This may occur by way of a capture module 112 as previously described that captures a user's input patterns. The captured data is analyzed to produce an input signature for the user account (block 404). Here, input patterns in the captured data are detected through the analysis and used to discover characteristics that can be used to distinguish the user's input patterns from other users. This may involve identifying key, distinguishing characteristics indicated by the data. In an implementation, an analytics module 216 may perform the analysis and create or update a knowledge database for the particular user. For instance, one or more input characteristics may be associated with a user account of the particular user as user account data 212 or otherwise. The input signature for an account may therefore reflect distinguishable characteristics of input supplied in relation to the user account. This may include at least timing for different keystrokes and key combinations associated with typing input. Distinguishable characteristics of other kinds of input (e.g., touch, mouse, gestures, etc.) may also be reflected by the input signature.

An input challenge is presented in conjunction with an authentication sequence to authenticate the user to access corresponding resources (block 406) and a reproduction of the input challenge is received for authentication of the user account (block 408). Access to resources is selectively provided based upon a determination regarding whether the reproduction of the input challenge matches the input signature associated with the user account (block 410).

Here, a computing device 102 may render a user interface for authentication that includes an input challenge generated by a challenge generator 218. A user may then type an indicated textual passphrase and/or otherwise provide input to reproduce the designated input challenge. The reproduction may be supplied to an analytics module 216 to make the determination regarding whether the reproduction of the input challenge matches the input signature. This may occur locally at the computing device by way of an input signature service 214 that is deployed to the device. In this example, the input signature service 214 including the analytics module 216 and the challenge generator 218 may be implemented by the computing device to control access to local resources/accounts. As described previously though, comparable techniques and components may be implemented by a service provider 106 and/or in a distributed manner between the service provider and a computing device 102 to control access to web-based resources.

Having considered example details and techniques regarding input challenged based authentication, consider a discussion of an example system in accordance with one or more embodiments.

Example System

Figure 5:
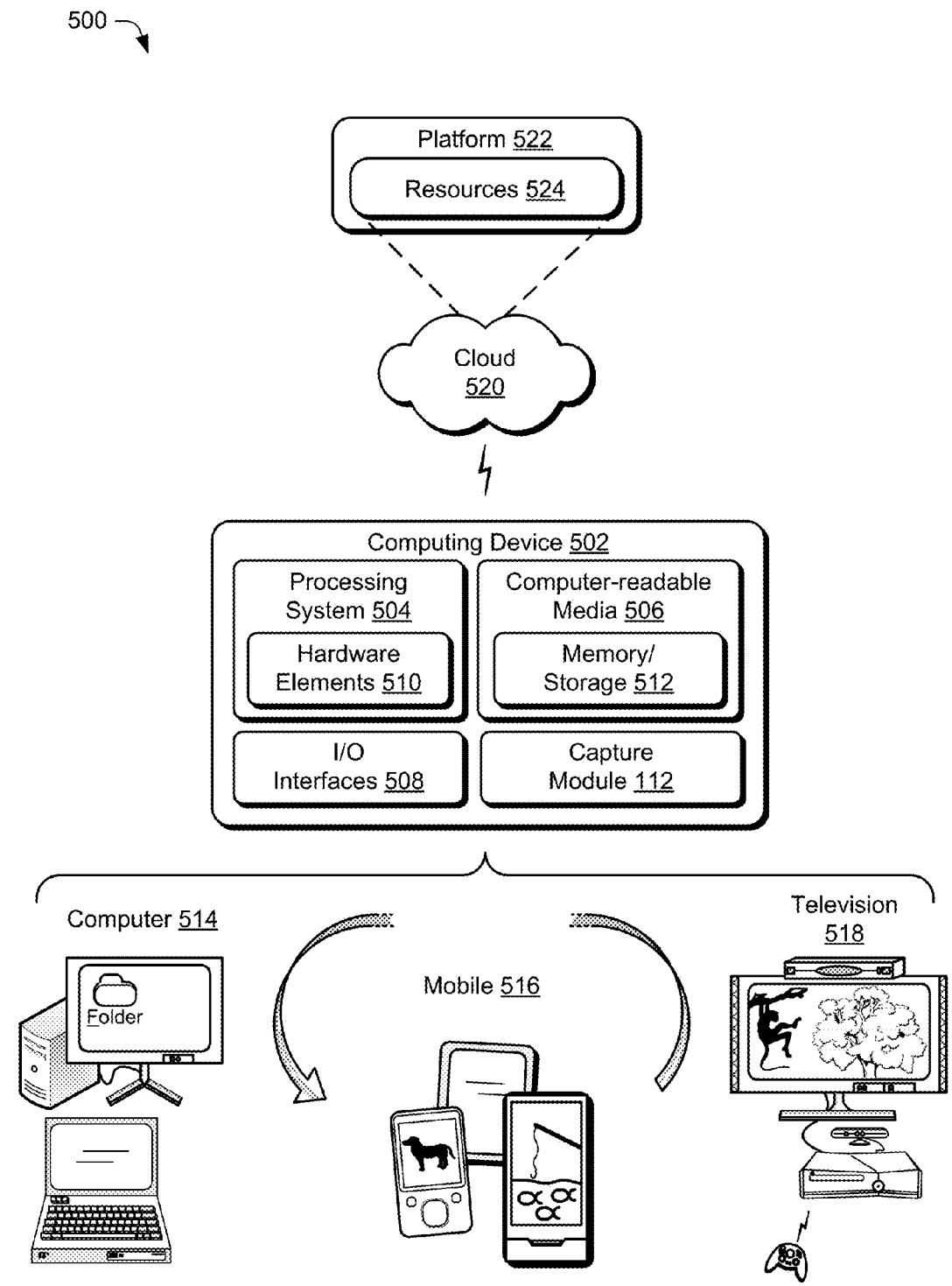
FIG. 5 is a block diagram of a system showing details of example devices and components in accordance with one or more implementations.

FIG. 5 illustrates an example system 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" may refer to media and/or devices that enable storage of information in contrast to mere signal transmission, carrier waves, or signals per se. Thus, computer-readable storage media does not include signal bearing or transitory media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, capture module 112, authentication service 210, input signature service 214, and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on.

The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the capture module 112 on the computing device 502. The functionality represented by the capture module 130 and other modules/applications may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method implemented by a computing device to control access to resources using input-based challenges comprising:
   associating with a user account a background-generated input signature that is indicative of characteristics of input supplied in relation to the user account and via different input mechanisms, the background-generated signature being generated by the computing device in a background of normal user interaction with the computing device;
   in response to an attempt to access the resources with the user account, outputting a challenge by the computing device that presents a non-secret pattern of input that is to be reproduced via at least one of the different input mechanisms by a user of the user account to gain the access;
   ascertaining, by the computing device, input characteristics for a reproduction of the non-secret pattern of input received in response to the challenge; and
   determining, by the computing device, whether the input characteristics ascertained for the reproduction via the at least one different input mechanism match the characteristics of input for the at least one different input mechanism that are indicated by the background-generated input signature to selectively control the access to the resources via a user interface displayed by the computing device.

2. The method as recited in claim 1, further comprising: enabling the access to the resources when the input characteristics for the reproduction are determined to match the characteristics of input indicated by the background-generated input signature.

3. The method as recited in claim 1, further comprising: denying the access to the resources when the input characteristics for the reproduction are determined not to match the characteristics of input indicated by the background-generated input signature.

4. The method as recited in claim 1, wherein the non-secret pattern of input comprises a textual passphrase.

5. The method as recited in claim 1, wherein the non-secret pattern of input comprises a combination of different input mechanisms including at least one non-textual element.

6. The method as recited in claim 1, further comprising deriving the background-generated input signature based upon analysis of input signature data captured when a user interacts with the user account via one or more computing devices using one or more of the different input mechanisms.

7. The method as recited in claim 6, wherein the background-generated input signature data is captured as the user provides input during the normal user interactions and without using explicit training activities.

8. The method as recited in claim 1, wherein the characteristics of input indicated by the background-generated input signature include one or more of: keystroke timing, mouse click timing, shapes of mouse arcs, keystroke patterns, timing between input combinations, key to key timing, touch input locations, or gesture shapes.

9. The method as recited in claim 1, wherein outputting the challenge comprises:
generating the non-secret pattern of input for inclusion in an authentication user interface that implements an authentication sequence for the access to the resources; and
providing the non-secret pattern for display in the clear within the authentication user interface.

10. The method as recited in claim 1, wherein the user account comprises a local account with an operating system of the computing device.

11. The method as recited in claim 1, wherein the user account comprises an account with a service provider to access web-based resources available from the service provider over a network.

12. The method as recited in claim 1, wherein:
the ascertaining of the input characteristics for the reproduction comprises detecting the input characteristics of the reproduction; and
the determining whether the input characteristics ascertained for the reproduction match the characteristics of the input indicated by the background-generated input signature comprises comparing the input characteristics ascertained for the reproduction to the characteristics of input indicated by the background-generated input signature to find any matching characteristics, the determining based at least in part upon how many matching characteristics are found.

13. A method to control access to resources using input-based challenges comprising:
capturing, by a computing device, data indicative of input patterns associated with a user account during user interactions with the computing device and without requesting a user provide input in conjunction with explicit training activities for learning the input patterns;
analyzing, by the computing device, the data to produce an input signature maintained in association with the user account and indicative of input characteristics derived from the captured data, the input signature configured to indicate additional input characteristics derived from data captured via at least one other computing device;
presenting an input challenge via the computing device in conjunction with an authentication sequence to authenticate the user account to access resources;
receiving a reproduction of the input challenge for authentication of the user account; and
selectively providing the access to the resources via a user interface displayed by the computing device based upon a determination regarding whether the reproduction of the input challenge matches the input signature associated with the user account.

14. The method as recited in claim 13, wherein the input challenge comprises a pattern of input for reproduction by a user including at least a textual passphrase for the user to type.

15. The method as recited in claim 13, wherein the input signature reflects distinguishable characteristics of input supplied in relation to the user account including at least timing for different keystrokes and key combinations associated with typing input.

16. The method as recited in claim 13, wherein capturing the data indicative of the input patterns comprises monitoring input supplied in relation to the user account via one or more input mechanisms during interaction of a user with one or more computing devices.

17. A system to control access to resources using input-based challenges, the system comprising:
one or more processors; and
one or more computer readable storage media storing instructions that are executable by the one or more processors to implement an authentication service to perform operations comprising:
associating an input signature with a user account that is indicative of characteristics of input supplied via multiple input mechanisms in relation to the user account, the input signature generated from background data collected based upon the input during user interactions conducted using the user account;
in response to an attempt to access resources with the user account via a user interface displayed by a computing device, outputting a challenge that presents a non-secret pattern of input that is to be reproduced by a user of the user account to gain the access;
comparing input characteristics for a reproduction of the non-secret pattern of input received in response to the challenge to the characteristics of input indicated by the input signature associated with the user account;
determining whether the input characteristics for the reproduction match the characteristics of input indicated by the input signature; and
based on the determining:
enabling the access to the resources via the user interface when the input characteristics for the reproduction are determined to match the characteristics of input indicated by the input signature; and
denying the access to the resources via the user interface when the input characteristics for the reproduction are determined not to match the characteristics of input indicated by the input signature both when the reproduction of the non-secret pattern matches the non-secret pattern and when the reproduction of the non-secret pattern does not match the non-secret pattern.

18. The system of claim 17, wherein the non-secret pattern of input comprises at least a textual passphrase for input by typing.

19. The system of claim 17, wherein the characteristics of input indicated by the input signature include one or more of keystroke timing, mouse click timing, shapes of mouse arcs, keystroke patterns, timing between input combinations, key to key timing, touch input locations, or gesture shapes.

20. The system of claim 17, wherein the input signature reflects distinguishable characteristics of input supplied in relation to the user account including at least timing for different keystrokes and key combinations associated with typing input.

\* \* \* \* \*